United States Patent [19]

Fortmann

[11] 4,247,155
[45] Jan. 27, 1981

[54] RESILIENT FOIL BEARINGS

[75] Inventor: William E. Fortmann, W. Simsbury, Conn.

[73] Assignee: United Technologies Corporation, Hartford, Conn.

[21] Appl. No.: 48,199

[22] Filed: Jun. 13, 1979

[51] Int. Cl.³ ............................................. F16C 32/06
[52] U.S. Cl. ....................................... 308/9; 308/121; 308/160
[58] Field of Search ...................... 308/5 R, 9, 26, 121, 308/139 R, 160, 163, 164, 168, 172

[56] References Cited

U.S. PATENT DOCUMENTS

| | | | |
|---|---|---|---|
| 1,494,010 | 5/1924 | Newhouse | 308/160 |
| 2,872,256 | 2/1959 | Thomson | 308/163 |
| 3,131,004 | 4/1964 | Sternlicht | 308/26 |
| 3,291,543 | 12/1966 | Nigh | 308/160 |
| 3,375,046 | 3/1968 | Marley | 308/164 |
| 3,382,014 | 5/1968 | Marley | 308/160 |
| 3,423,139 | 1/1969 | Baudry | 308/160 |
| 3,635,534 | 1/1972 | Barnett | 308/121 |
| 3,677,612 | 7/1972 | Barnett et al. | 308/9 |
| 3,747,997 | 7/1973 | Winn | 308/9 |
| 3,809,443 | 5/1974 | Cherubim | 308/9 |
| 4,082,375 | 2/1978 | Fortmann | 308/9 |

Primary Examiner—Frederick R. Schmidt
Attorney, Agent, or Firm—John Del Ponti

[57] ABSTRACT

A fluid-film foil bearing has a resilient bearing insert assembly disposed between a rotatable and a stationary member. The insert assembly comprises a plurality of resilient corrugated spring pad supports separated from each other to provide a series of spaces and a compliant, unitary foil mounted on the pad supports, the foil having a plurality of perforations aligned across its entire width and over the spaces which are operative under dynamic conditions both to initiate foil deflection and to cause uniform replenishment of fluid lost through side leakage.

9 Claims, 9 Drawing Figures

RESILIENT FOIL BEARINGS

BACKGROUND OF THE INVENTION

The present invention relates to fluid-film bearings for rotating machinery and more particularly to bearings which include unique resilient load-supporting foil bearing insert assemblies.

Hydrodynamic bearings are well known and have been used effectively as supports for rotating machinery, including high speed applications. The term hydrodynamic bearing, as used herein, defines that class of fluid-film bearings which has its surfaces separated by a thin layer of either liquid or gas, the film being established and the pressure generated therein by the relative motion between the bearing surfaces. This is distinguished from bearings of the hydrostatic type which require feed of pressurized fluid from an external source.

Although many past hydrodynamic bearings have been rigid and rigidly mounted and thus not self-aligning unless provided with complex, expensive and frequently troublesome gimbal and pivot supports, recent advances have resulted in compliant hydrodynamic bearings equipped with foil-insert assemblies designed to generate lubricating films and to support loads.

Some, such as those shown in U.S. Pat. Nos. 3,375,046; 3,382,014 and 4,082,375 may employ a plurality of bearing foils and some, such as those shown in U.S. Pat. Nos. 3,747,997 and 3,809,443 may use a unitary solid bearing foil. In U.S. Pat. No. 3,635,534, both types are disclosed. All, however, rely on the hydrodynamic formation of a plurality of lubricating fluid wedges which, due to side leakage and an inability to uniformly replenish the fluid thus lost, lose film thickness.

SUMMARY OF THE INVENTION

It is an object of the present invention to provide an improved hydrodynamic foil bearing which overcomes the aforesaid problems of the prior art. More specifically, it is an object of the present invention to provide a hydrodynamic bearing which includes a resilient bearing insert assembly having a unitary, compliant perforated bearing foil which, in combination with a plurality of wave spring support pads, forms and efficiently maintains lubricating wedges at speed under load.

In accordance with the present invention, a novel and improved foil bearing insert assembly includes a compliant, unitary foil mounted on a plurality of resilient, corrugated, spaced spring pad supports, the foil having a plurality of perforations arrayed over the spaces between pad supports and operative under dynamic conditions to both initiate foil deflection for the formation of lubricating wedges and to cause uniform replenishment of fluid lost through side leakage.

BRIEF DESCRIPTION OF THE DRAWING

An understanding of the invention will become more apparent to those skilled in the art by reference to the following detailed description when viewed in light of the accompanying drawings, wherein.

DESCRIPTION OF THE PREFERRED EMBODIMENT

Figure 1:
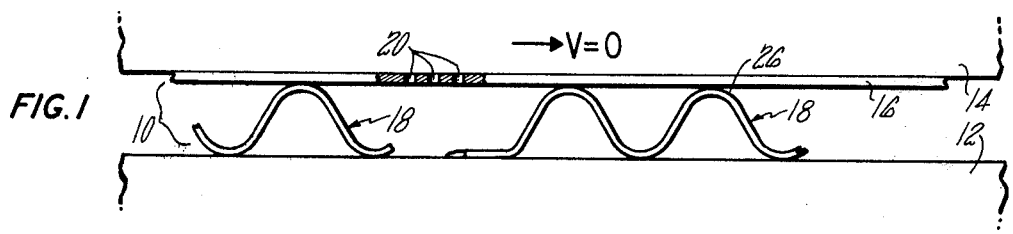
FIG. 1 is a side view, partly in section, with parts broken away illustrating a portion of the invention in a static position.

Referring now to the drawings, wherein like numerals indicate like parts, a bearing insert assembly 10 is shown positioned between a stationary supporting base member 12 and a relatively movable member 14. Of course, in the case of a thrust bearing, the movable member is a thrust runner and, in the case of a journal bearing, is a shaft. The insert assembly 10 is mounted on the base member 12 and is thus stationary with respect to the movable member 14.

Figure 2:
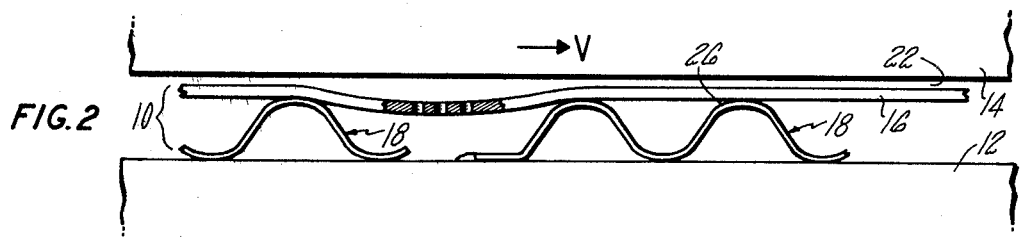
FIG. 2 is a side view, partly in section, with parts broken away illustrating a portion of the invention in a dynamic position.

The bearing assembly 10 comprises a unitary compliant foil membrane 16 supported by a plurality of resilient, corrugated spring pad supports 18. The foil membrane 16 is a thin foil-like sheet of metal or other suitable material, which is compliant, i.e., whose thickness relative to its lateral dimensions is sufficiently small to allow local bending or deflection upon generation of the hydrodynamic fluid film and to allow accommodation of irregularities and misalignments. As shown, the foil 16 is provided with perforations 20 arrayed in a line transverse to the direction of movement of the movable member 14. The perforations 20 extend across the entire transverse dimension of the foil and function to initiate foil deflection during operation as shown in FIG. 2 since they represent a line of relative weakness in the foil. In addition, the perforations 20 provide a passageway through which fluid may flow uniformly to the space 22 between the foil 16 and movable member 14 in order to maximize pressure maintenance by efficiently replacing fluid lost due to side leakage. As will be appreciated, the line of perforations 20 is positioned above the space between successive spring pads 18 to allow proper foil deflection and free fluid flow.

Figure 3:
FIGS. 3, 4 and 5 are enlarged side views similar to FIG. 1 but showing modified foil membranes.
Figure 4:
Figure 5:

As shown in FIGS. 3, 4, and 5, the foil can be treated by respectively, shallow grooving, gentle deformation, or rounding of the edges of the perforations (as provided by piercing), in order to allow low speed build-up of a hydrodynamic film, thus initiating the sagging which provides the basic film establishment mechanism.

Figure 6:
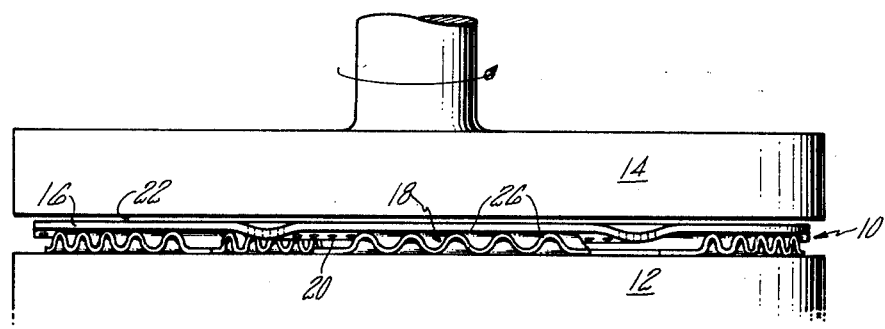
FIG. 6 is a side view of a thrust bearing incorporating the present invention.
Figure 7:
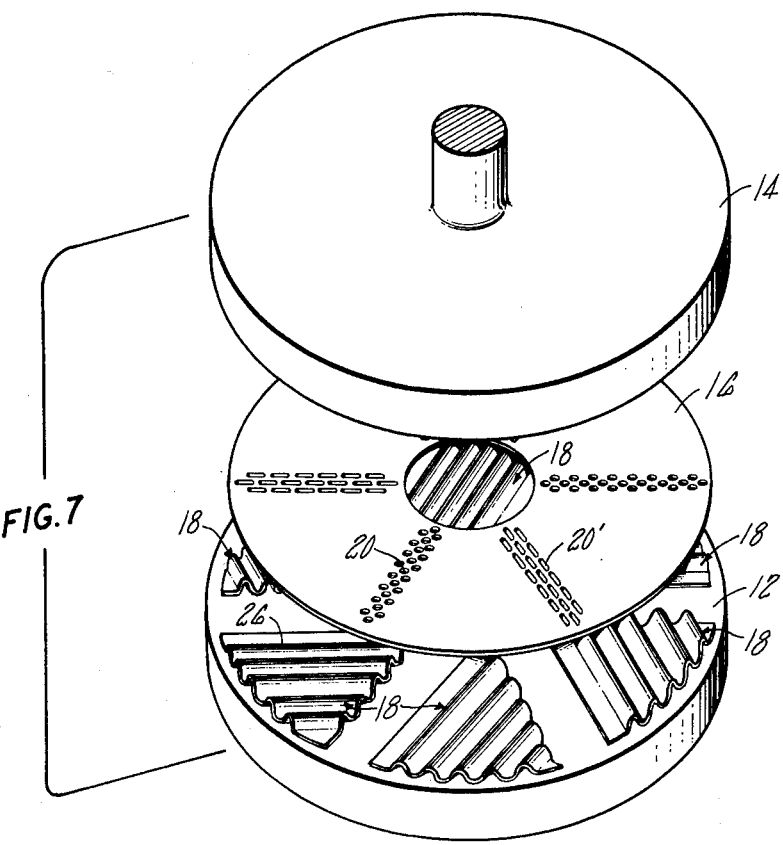
FIG. 7 is an exploded perspective view of the thrust bearing of FIG. 6.

In the preferred embodiment of FIGS. 6 and 7, the corrugated spring pads 18 are secured at their leading edge 24 to base member 12 by welding or other suitable means. Each pad 18 has a plurality of uniformly spaced corrugations or ridges 26 which are parallel to the leading edge of the film wedge and generally transverse to the direction of movement of member 14. The space between adjacent corrugations on the same pad is small relative to the space between adjacent corrugations or bordering pads so that deflection of the foil will occur essentially only between the pads 18 but not between individual corrugations on the same pad. In this way, each pad 18 provides the foil 16 with resilient support for an extended circumferential length, one whose dimension is not prone to excessive film loss from side leakage before being replenished by fluid flow through perforations 20.

Figure 9:
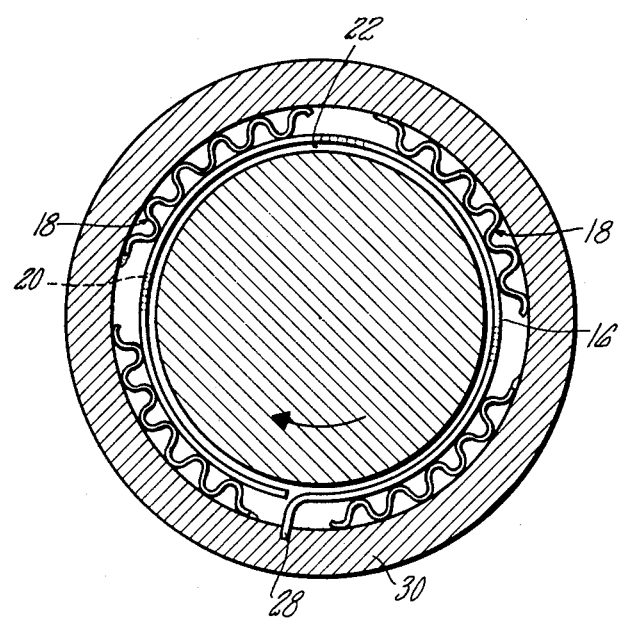
FIG. 9 is a side view, in section, of a journal bearing incorporating the present invention.

As shown in the thrust bearing of FIGS. 6 and 7, the foil membrane 16 is in the form of a planar disk and the spring pads 18 are in the form of segments. In FIG. 9, the invention is embodied in a journal bearing with the foil membrane being in the form of a single cylindrical sheet having a fixed end 28 secured to the bushing 30 and having its opposite end free.

The perforations 20 may take various forms, some of which are shown in FIG. 7, e.g., circular 20 or elongated 20', and may be in various arrays, e.g., single, double or triple line with various spacings and patterns.

Figure 8:
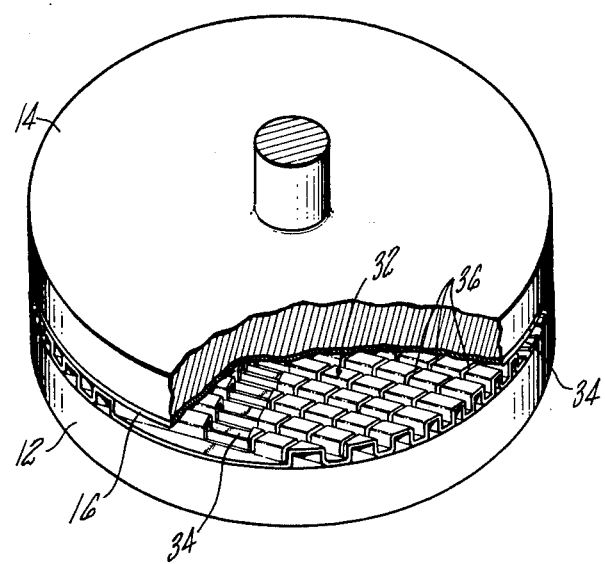
FIG. 8 is a perspective view of a modified resilient support means for the foil membrane.

FIG. 8 shows an alternative to the use of completely separate spring pads 18 by a unitary spring pad 32 having its parallel corrugations 26 partially separated into spring pad supports 18 by grooves 34. In the case of the thrust bearing pad illustrated, the grooves are radially disposed for registry beneath the radially disposed lines of perforations 20 in the foil 16. In addition, in order to assist in cooling, the pad 32 is provided with a plurality of parallel transverse slots 36 through its corrugations 26.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. In a hydrodynamic fluid foil bearing having a base member with a bearing surface thereon and a second member supported on said base member and having a cooperative bearing surface spaced from said first member bearing surface, said members being relatively movable, the improvement which comprises
    a resilient bearing insert assembly positioned between sad bearing surfaces, said assembly comprising a plurality of resilient corrugated spring pad supports mounted on said base member bearing surface, said pad supports being separated from each other to provide a series of spaces therebetween, and a compliant unitary foil mounted on said pad supports, said foil having a plurality of perforations aligned across its entire width and over said spaced operative under dynamic conditions both to initiate foil deflection and to cause uniform replenishment of fluid lost through side leakage.

2. The invention of claim 1 wherein each of said pad supports has a leading edge normal to the direction of relative movement of said members and further has a plurality of alternating elevations and depressions forming corrugations parallel to said leading edge.

3. The invention of claim 2 wherein said bearing is a thrust bearing and said aligned perforations are radially disposed in rows on said foil.

4. The invention of claim 3 wherein said foil is deformed toward said base member along each said row.

5. The invention of claim 3 wherein said foil is grooved along each said row.

6. A hydrodynamic fluid film thrust bearing comprising:
    a base member having a first bearing surface thereon;
    a supported member above said base member and having a cooperative bearing surface spaced above the bearing surface of said base member, said members being relatively rotatable;
    a resilient bearing insert assembly disposed between said bearing surfaces comprising:
    a plurality of spring elements mounted on said first bearing surface and uniformly spaced from each other, each of said elements having a leading edge normal to the direction of rotation and a plurality of elevations and depressions parallel to said leading edge;
    a single, compliant unitary planar foil mounted on said spring elements, said foil having a plurality of rows of radially disposed apertures aligned across its entire width and over the spaces between said spring elements, said apertures being operative under dynamic conditions to both initiate foil deflection and uniformly maintain film thickness.

7. The invention of claim 6 wherein there are a plurality of said rows of apertures over each said space.

8. The invention of claim 7 wherein said foil is deformed toward said base member along each said row.

9. The invention of claim 7 wherein said foil is grooved along each said row.

* * * * *